United States Patent
Son et al.

(10) Patent No.: US 7,953,458 B2
(45) Date of Patent: May 31, 2011

(54) SYSTEM AND METHOD FOR CONTROLLING SLEEP MODE OPERATION IN A COMMUNICATION SYSTEM

(75) Inventors: Jung-Je Son, Seongnam-si (KR); Hyoung-kyu Lim, Seoul (KR); Yeong-Moon Son, Anyang-si (KR); Sung-Jin Lee, Seoul (KR); Pan-Yuh Joo, Seoul (KR); Bong-Dae Choi, Seoul (KR)

(73) Assignees: Samsung Electronics Co., Ltd., Suwon-si (KR); Korea University Industrial & Academic Collaboration Foundation, Seoul (KR)

( * ) Notice: Subject to any disclaimer, the term of this patent is extended or adjusted under 35 U.S.C. 154(b) by 734 days.

(21) Appl. No.: 12/004,568

(22) Filed: Dec. 21, 2007

(65) Prior Publication Data

US 2008/0153426 A1 Jun. 26, 2008

(30) Foreign Application Priority Data

Dec. 22, 2006 (KR) .................. 10-2006-0132729

(51) Int. Cl.
*H04M 1/00* (2006.01)
*H04B 1/38* (2006.01)
(52) U.S. Cl. .................... 455/574; 455/458
(58) Field of Classification Search .......... 455/574, 455/458; 370/311
See application file for complete search history.

(56) References Cited

U.S. PATENT DOCUMENTS

| 6,480,476 | B1 | 11/2002 | Willars |
| 7,130,668 | B2* | 10/2006 | Chang et al. ............... 455/574 |
| 7,573,841 | B2 | 8/2009 | Lee et al. |
| 7,631,202 | B2 | 12/2009 | Guo et al. |
| 2005/0197171 | A1* | 9/2005 | Son et al. .............. 455/574 |
| 2005/0266896 | A1* | 12/2005 | Son et al. .............. 455/574 |
| 2006/0030305 | A1* | 2/2006 | Lee et al. .............. 455/418 |
| 2006/0039320 | A1* | 2/2006 | Kang et al. ............. 370/328 |

FOREIGN PATENT DOCUMENTS

| KR | 1020050089625 A | 9/2005 |
| KR | 1020050120521 A | 12/2005 |
| KR | 1020060105434 A | 10/2006 |

OTHER PUBLICATIONS

Office Action dated Oct. 14, 2009 in connection with Korean Patent Application No. 2006-132729.

* cited by examiner

*Primary Examiner* — Lewis G West

(57) ABSTRACT

A method for controlling a sleep mode operation by a mobile station (MS) in a communication system. In the sleep mode operation control method, after entering a sleep mode, the MS transitions to an awake state in a listening interval. When there is data to transmit or receive to/from a base station (BS) in the awake state, the MS causes a neutral interval following the listening interval to transition to the awake state, and transmits or receives the data. The neutral interval is an interval where transition to the awake state and sleep state is available according to the data transmission/reception of the MS operating in the sleep mode.

16 Claims, 4 Drawing Sheets

SYSTEM AND METHOD FOR CONTROLLING SLEEP MODE OPERATION IN A COMMUNICATION SYSTEM

CROSS-REFERENCE TO RELATED APPLICATION(S) AND CLAIM OF PRIORITY

This application claims priority under 35 U.S.C. §119(a) to a Korean Patent Application filed in the Korean Intellectual Property Office on Dec. 22, 2006 and assigned Serial No. 2006-132729, the disclosure of which is incorporated herein by reference.

TECHNICAL FIELD OF THE INVENTION

The present invention relates generally to a communication system, and in particular, to a system and method for controlling a sleep mode in a communication system.

BACKGROUND OF THE INVENTION

Communication systems are evolving into advanced systems that provide mobile stations with services capable of high-speed, high-capacity data transmission and reception. An Institute of Electrical and Electronics Engineers (IEEE) 802.16e communication system is a typical example of such a communication system. In the IEEE 802.16e communication system, communication between a mobile station (MS) and a base station (BS) is constantly kept in an operation of a normal mode.

In the IEEE 802.16e communication system, the mobile station normally monitors the downlink to receive data from the base station. The mobile station usually monitors the downlink even when the base station has no data to transmit to the mobile station and/or the mobile station has no data to transmit to the base station, thus causing continual power consumption in the mobile station.

Because the IEEE 802.16e communication system considers mobility of the mobile station, the power consumption of the mobile station is an important factor in the entire system performance. Therefore, to minimize the power consumption of the mobile station, a sleep mode operation between the mobile station and the base station, and an awake mode operation corresponding to the sleep mode operation have been proposed. In addition, to cope with the change in the channel state with the base station, the mobile station periodically performs a ranging operation for correcting timing offset, frequency offset, and power with the base station.

FIG. 1 illustrates a sleep mode operation in a general communication system.

Referring to FIG. 1, in step 101, a mobile station (MS) 100, if it desires to transition from an awake mode to a sleep mode, transmits a MOBile-SLeeP-REQuest (MOB-SLP-REQ) message to a base station (BS) 110. Upon receipt of the MOB-SLP-REQ message, the BS 110 determines in step 103 whether to grant the mode transition to the sleep mode of the MS 100 taking the conditions of the BS 110 and MS 100 into account, and transmits a MOBile-SLeeP-ReSPonse (MOB-SLP-RSP) message to the MS 100 according to the determination result. The MOB-SLP-RSP message includes a listening interval parameter. In the listening interval, the BS 110, if it has data to transmit to the MS 100, can transmit a MOBile-TRaFfic-INDication (MOB-TRF-IND) message including an identifier (ID), or indicator, of the MS 100.

Upon receipt of the MOB-SLP-RSP message from the BS 110, the MS 100 starts the sleep mode operation in accordance with the MOB-SLP-RSP message. The MS 100 recognizes that it should perform the operation in accordance with the listening interval parameter included in the MOB-SLP-RSP message. In addition, the MS 100, although it is in the sleep mode state, can immediately operate in the awake mode in the sleep mode state when it has data to transmit to the BS 110.

In step 105, the BS 110 transmits a MOB-TRF-IND message to the MS 100 in the listening interval of the sleep mode. Here, the MOB-TRF-IND message is assumed to be a message not including the identifier of the mobile station (MS). Because the MOB-TRF-IND message is a message not corresponding to the MS 100, the MS 100, after decoding the MOB-TRF-IND message, performs the sleep mode operation again, determining that its own identifier is not included therein.

After a lapse of a predetermined time, if the BS 110 has data to transmit to the MS 100 in the listening interval of the sleep mode, it transmits a MOB-TRF-IND message including an identifier of the MS 100 in step 107. Because the MOB-TRF-IND message is a message corresponding to the MS 100, the MS 100, after decoding the MOB-TRF-IND message, transitions to the awake mode and receives data from the BS 110, determining that its own identifier is included therein.

After the data transmission/reception between the MS 100 and the BS 110 is completed, the MS 100 and the BS 110 exchange again a MOB-SLP-REQ message and a MOB-SLP-RSP message to make mode transition back to the sleep mode. By exchanging the MOB-SLP-REQ message and the MOB-SLP-RSP message for the mode transition to the sleep mode, the MS 100 and the BS 110 may perform unnecessary message transmission, thereby wasting the uplink and downlink resources and causing the power consumption. In addition, the MS 100 should transmit a BandWidth-REQuest (BW-REQ) message to receive a bandwidth allocated for transmitting the MOB-SLP-REQ message to the BS 110 and should perform bandwidth ranging, thereby causing a delay in the time for which the MS 100 makes the mode transition to the sleep mode.

SUMMARY OF THE INVENTION

To address the above-discussed deficiencies of the prior art, it is a primary aspect of the present invention to address at least the problems and/or disadvantages and to provide at least the advantages described below. Accordingly, an aspect of the present invention is to provide a system and method for controlling a sleep mode operation in a communication system.

An aspect of the present invention is to provide a sleep mode operation control system and method for reducing resource waste in a communication system.

An aspect of the present invention is to provide a sleep mode operation control system and method for reducing power consumption of a mobile station in a communication system.

According to one aspect of the present invention, there is provided a method for controlling a sleep mode operation by a mobile station in a communication system. The sleep mode operation control method includes, after entering a sleep mode, transitioning to an awake state in a listening interval; and when there is data to transmit or receive to/from a base station in the awake state, causing a neutral interval following the listening interval to transition to the awake state, and transmitting or receiving the data. The neutral interval is an interval where transition to the awake state and sleep state is available according to the data transmission/reception of the mobile station operating in the sleep mode.

According to another aspect of the present invention, there is provided a method for controlling a sleep mode operation by a base station in a communication system. The sleep mode operation control method includes, when there is data to transmit or receive to/from a mobile station existing in a listening interval, transmitting or receiving the data in a neutral interval following the listening interval. The neutral interval is an interval where transition to the awake state and sleep state is available according to the data transmission/reception of the mobile station operating in the sleep mode.

According to further another aspect of the present invention, there is provided a system for controlling a sleep mode operation of a mobile station. The system includes a base station and the mobile station. After entering a sleep mode, the mobile station transitions to an awake state in a listening interval, and when there is data to transmit or receive to/from the base station in the awake state, the mobile station causes a neutral interval following the listening interval to transition to the awake state, and transmits or receives the data. The neutral interval is an interval where transition to the awake state and sleep state is available according to the data transmission/reception of the mobile station operating in the sleep mode.

According to yet another aspect of the present invention, there is provided a system for controlling a sleep mode operation of a base station. The system includes the base station, and a mobile station. When there is data to transmit or receive to/from the mobile station existing in a listening interval, the base station transmits or receives the data in a neutral interval following the listening interval. The neutral interval is an interval where transition to the awake state and sleep state is available according to the data transmission/reception of the mobile station operating in the sleep mode.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

Figure 1:
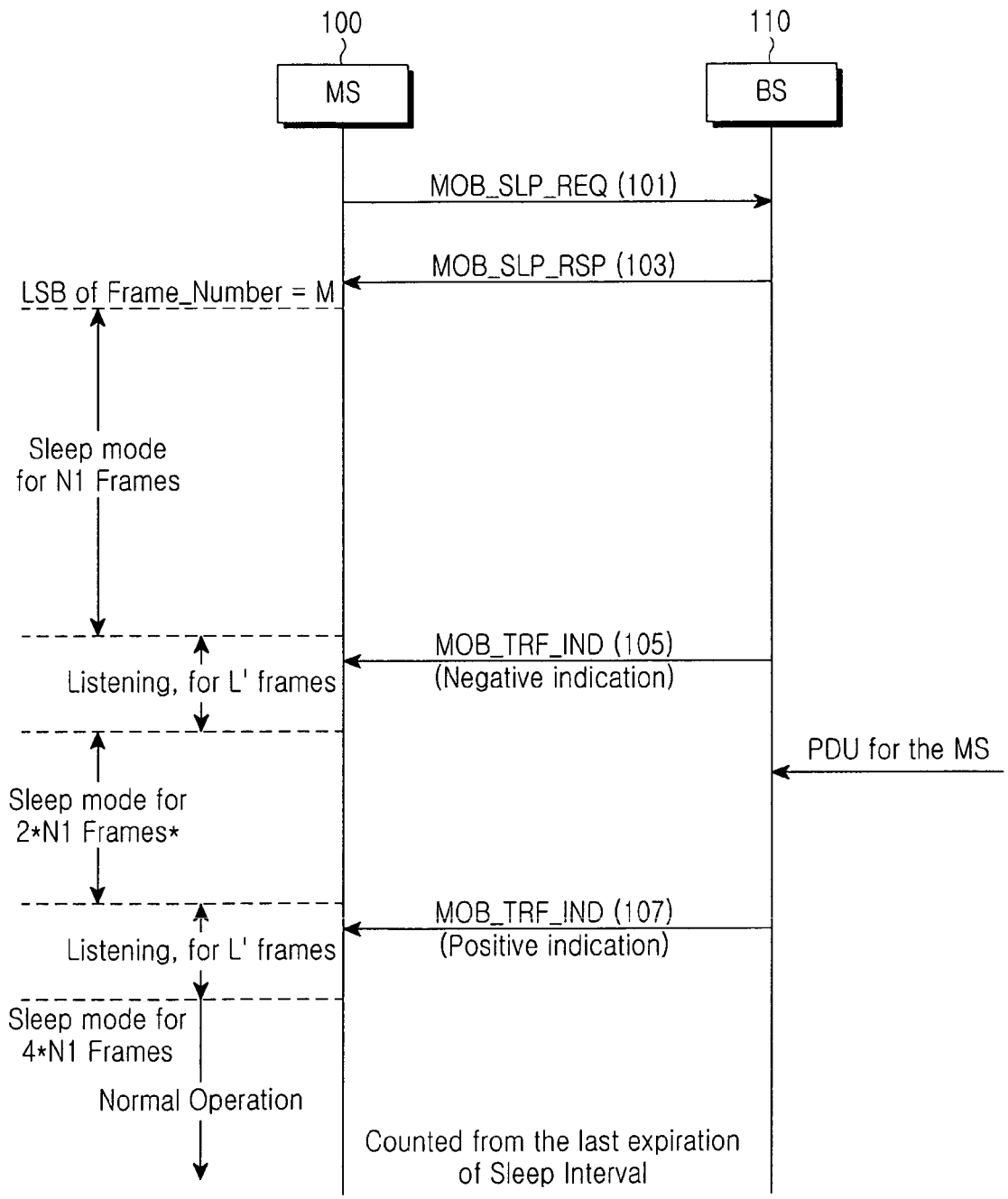
FIG. 1 illustrates a sleep mode operation in a general communication system.

FIGS. 1 through 4, discussed herein, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless network.

The present invention provides a system and method for controlling a sleep mode operation in a communication system.

Before a description of the present invention is given, a definition of a neutral interval will be given as follows. The neutral interval, an interval included in the sleep interval, will be defined as an interval in which transition can be made to an awake state or a sleep state according to the data transmission/reception.

In the proposed sleep mode operation control system and method, if a base station (BS) has transmit a TraFfic-INDication (TRF-IND) message as it has data to transmit to a mobile station (MS) in a listening interval, or if the MS has data to transmit to the BS, it operates the neutral interval as the awake state in which data transmission/reception is available. If the BS has not transmit a TRF-IND message as it has no data to transmit to the MS, or if the MS has no data to transmit to the BS, the neutral interval undergoes mode transition to the sleep state.

Although the sleep mode operation control system and method proposed by the present invention will be described with reference to the IEEE 802.16e communication system, by way of example, the proposed sleep mode operation control system and method can be applied not only to the IEEE 802.16e communication system but also to other communication systems.

In addition, although the present invention will be described with reference to the communication system in which one MS and a BS control the sleep mode operation, the sleep mode operation control system and method proposed by the present invention can be applied to other communication systems in which multiple MSs are located.

According to the present invention, for the first mode transition to the sleep mode of the MS, a SLeeP-REQuest (SLP-REQ) message and a SLeeP-ReSPonse (SLP-RSP) message are exchanged between the MS and the BS. An operation of the sleep mode includes an operation of a sleep interval, an operation of a listening interval, and an operation of a neutral interval. When the SLP-REQ and SLP-RSP messages are exchanged between the MS and the BS, the present invention determines an entry time into the sleep mode, a length of the sleep interval, a length of the listening interval, and a length of the neutral interval.

During the operation of the sleep mode based on the determined lengths of the sleep interval, the listening interval and the neutral interval, if there is a need for a change in items for the length of the sleep interval, the length of the listening interval, and the length of the neutral interval, it is possible to perform the sleep mode based on the changed items in the sleep mode operation by transmitting a message including the sleep control extended header shown in Table 1 or the items of the SLP-REQ and SLP-RSP messages as the items for the change from the BS to the MS or from the MS to the BS.

TABLE 1

| Name | Size | Description |
| --- | --- | --- |
| Power Saving class ID | 6 | It indicates a power saving ID affected by this sleep control extended header. |
| Operation | 1 | 0: inactivates power saving class. 1: activates power saving class. |
| Initial Sleep window | 10 | It indicates a value of a changed initial sleep window of the power saving class. |
| Neutral Sleep Window | 10 | It indicates a value of a changed neutral sleep window of the power saving class. |
| Final_Sleep_Window | 13 | It indicates a value of a changed final sleep window of the power saving class. |

The state, such as the idle state, where data transmission/reception between the MS and the BS is performed in the sleep mode consuming the power is defined as the awake state. The state where the MS exchanges no data with the BS for power consumption reduction is defined as the sleep state.

According to the present invention, while the BS and the MS enter the sleep mode and exist in the sleep interval, the BS in the listening interval transmits a TRF-IND message to the MS upon recognizing that the MS has entered the awake state. Thereafter, when data transmission/reception between the MS and the BS occurs or when the data transmission/reception does not happen, the operation proposed by the present invention adaptively applies the neutral interval as the sleep state or the awake state.

In the data transmission/reception between the MS and the BS, it is assumed that the BS performs data transmission to the MS after transmitting a TRF-IND message to the MS. However, the data transmission system and method for power consumption reduction, proposed herein by the present invention, can be applied even to the case where the BS performs data transmission without transmitting the TRF-IND message.

Figure 2:
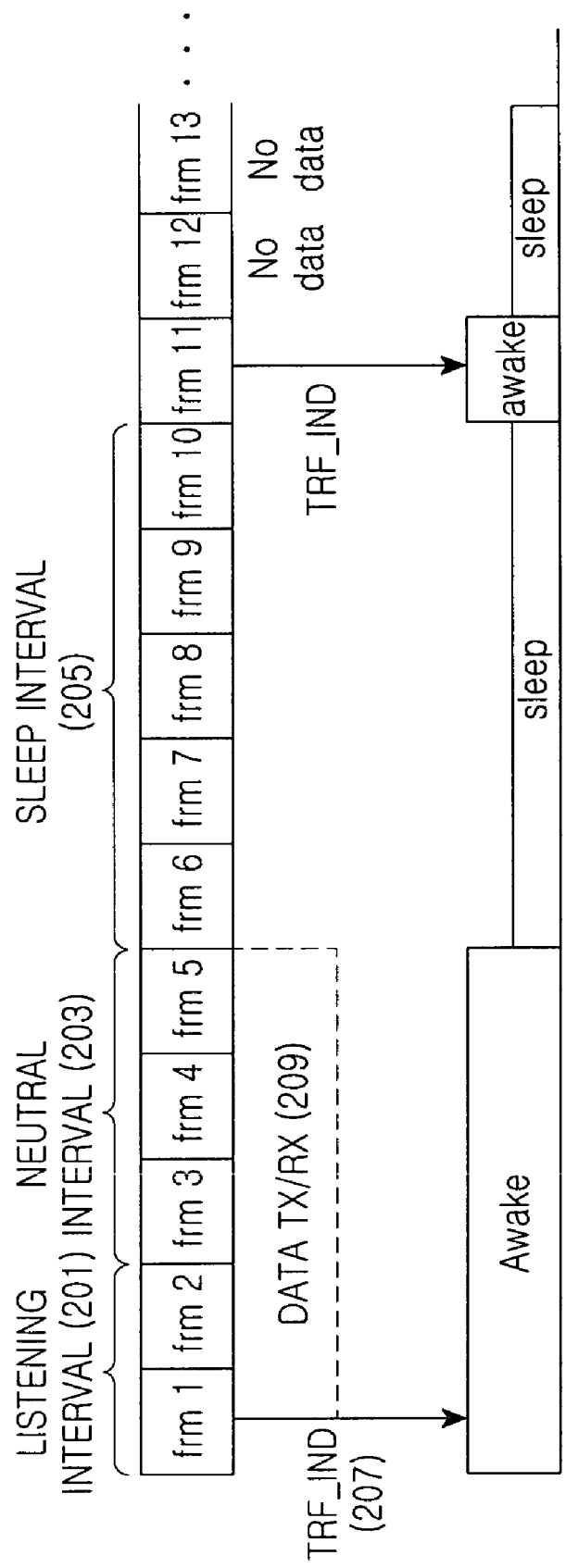
FIG. 2 illustrates an operation in which a base station and a mobile station transmit data in a communication system according to an embodiment of the present invention.

FIG. 2 illustrates an operation in which a BS and an MS transmit data in a communication system according to an embodiment of the present invention.

Referring to FIG. 2, a BS and an MS exchange an SLP-REQ message and an SLP-RSP message for mode transition to the sleep mode. In addition, the BS and the MS determine an entry time into the sleep mode, a length of the sleep interval, a length of the listening interval, and a length of the neutral interval through the exchange of the SLP-REQ message and the SLP-RSP message, and the MS enters the sleep mode. The sleep mode entry process is equal to that in the prior art, so a description thereof will be omitted herein.

It is assumed herein that through the exchange of the SLP-REQ message and the SLP-RSP message between the MS and the BS, the length of the listening interval is determined as 2 frames (frm) 201, the length of the neutral interval is determined as 3 frames 203, and the length of the sleep interval is determined as 5 frames 205. In addition, the frames are assumed to be arranged from a frame #1 to a frame #N.

The BS, previously recognizing that the MS is in the sleep interval of the sleep mode, recognizes the arrival of the listening interval at the time of the frame #1. In addition, the BS, as it has data to transmit to the MS, transmits a TRF-IND message including an identifier of the MS at the frame #1 (207). After transmitting the TRF-IND message, the BS immediately transmits the data to the MS (209). Also, if the MS has data to transmit to the BS, it transmits the data to the BS (209).

The BS and the MS, when they have entered a frame #3, recognize that they can perform data transmission/reception even in the neutral interval of the frame #3 to a frame #5. That is, the neutral interval means that the BS and the MS can perform the data transmission/reception as they are in the awake state.

The BS, previously recognizing that the MS is in the sleep interval of the sleep mode, recognizes the arrival of the listening interval at the time of the frame #1. At this moment, if the BS has no data to transmit to the MS or has transmit a TRF-IND message not including an identifier of the MS, or if the MS has no data to transmit to the BS, the MS transitions to the sleep state in the neutral interval because it has no need to perform data transmission/reception for the neutral interval of the frame #3 to the frame #5.

Accordingly, the BS, recognizing that the MS is in the sleep state for the neutral interval, cannot transmit the data even though it has data to transmit to the MS at the time of the frame #3, and performs the data transmission/reception at the next listening interval. The operation in the listening interval has been described above.

Although not illustrated in the drawing, in another method of the present invention, when it is recognized that the data transmission/reception will continuously occur between the MS and the BS, the neutral interval can be extended for further use thereof. The neutral interval can be further used by piggybacking the information indicating the further use corresponding to the neutral interval frame length preset in the TRF-IND message transmitted from the BS to the MS.

The information means the number of frames, and it will be assumed that the piggybacked information includes the contents indicating the further use of the neutral interval corresponding to, for example, three (3) frames.

That is, this means that although the neutral interval is defined as an interval of the frame #3 to the frame #5, the 3-frame neutral interval will be further used, recognizing that the data transmission/reception will continuously occur. The further use of the 3 frames means that the sleep interval of a frame #6 to a frame #8 out of the preset sleep interval of the frame #6 to frame #10 will be used as a neutral interval. This can enable the continuous data transmission/reception without interruption, but reduces the sleep interval.

If the neutral interval is extended by indicating the extended use of the neutral interval, the items for the lengths of the listening interval, the neutral interval, and the sleep interval at the time after expiration of the corresponding neutral interval and sleep interval can use either the previously used values predefined between the BS and the MS, or the changed values.

Figure 3:
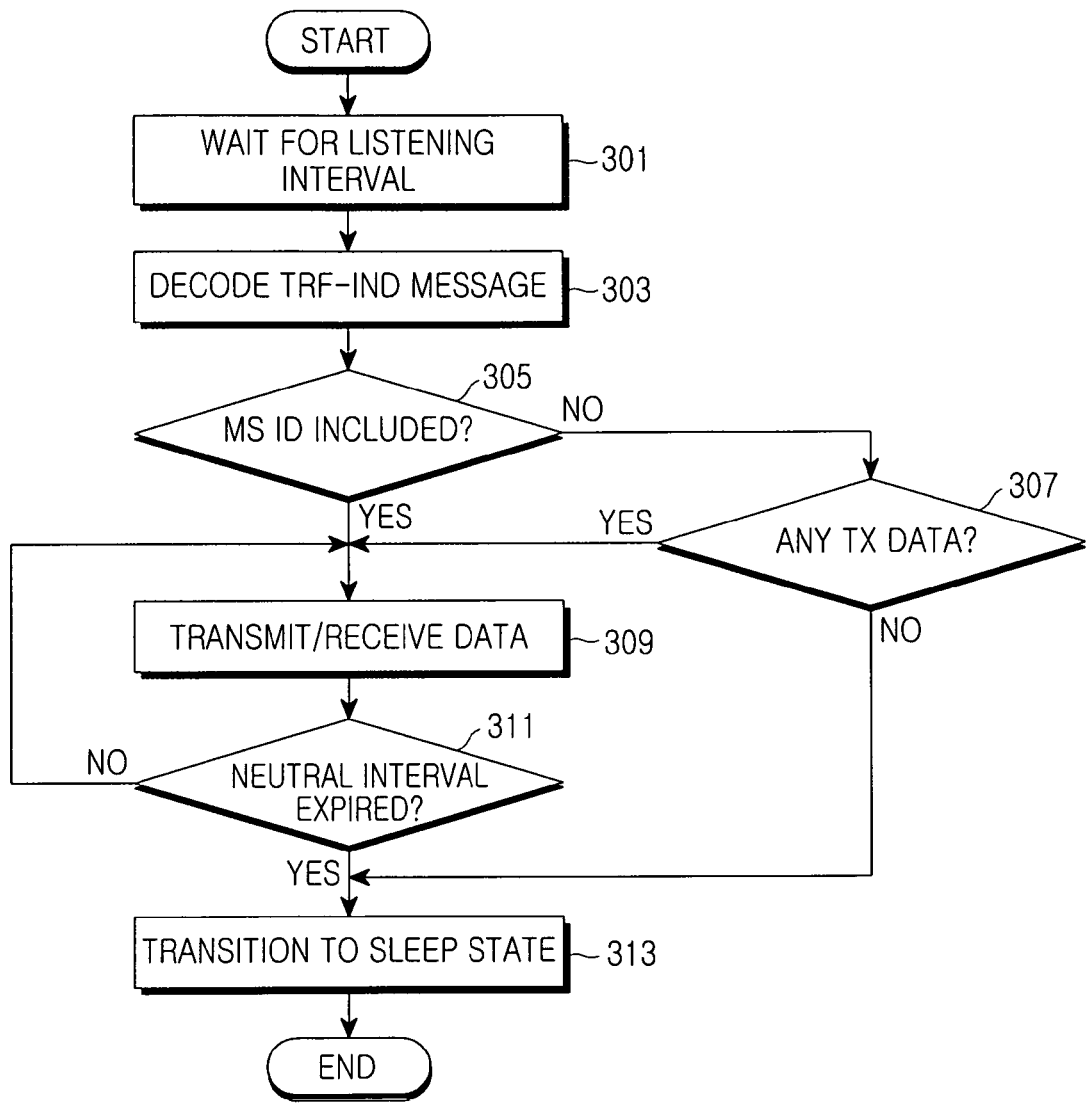
FIG. 3 illustrates an operation of a mobile station in a communication system according to an embodiment of the present invention.

FIG. 3 illustrates an operation of an MS in a communication system according to an embodiment of the present invention.

Referring to FIG. 3, in step 301, an MS, previously existing in the sleep interval of the sleep mode, enters a listening interval and waits for data received from a BS. Thereafter, in step 303, the MS receives a TRF-IND message from the BS and decodes the received TRF-IND message. The MS determines in step 305 whether an identifier of the MS itself is included in the TRF-IND message. If the identifier of the MS is included, the MS proceeds to step 309. Otherwise, if the identifier of the MS is not included, the MS proceeds to step 307.

In step 309, the MS transmits/receives data to/from the BS. Thereafter, the MS determines in step 311 whether the neutral interval has expired during the data transmission/reception between the MS and the BS. If the neutral interval has expired, the MS proceeds to step 313 where it transitions to the sleep state and then ends the operation.

However, if it is determined in step 305 that the identifier of the MS is not included, the MS proceeds to step 307 where it checks an uplink buffer to determine whether it has data to transmit to the BS.

If the MS has data to transmit, the MS proceeds to step 309 where it transmits the data to the BS. Thereafter, the MS determines in step 311 whether the neutral interval has expired during the data transmission/reception between the MS and the BS. If the neutral interval has expired, the MS proceeds to step 313 where it transitions to the sleep state and then ends the operation. However, if it is determined in step 311 that the neutral interval has not expired, the MS returns to step 309 and continues the data transmission/reception.

However, if it is determined in step 307 that the MS has no data to transmit to the BS, the MS proceeds to step 313 where it transitions to the sleep mode and then ends the operation.

Figure 4:
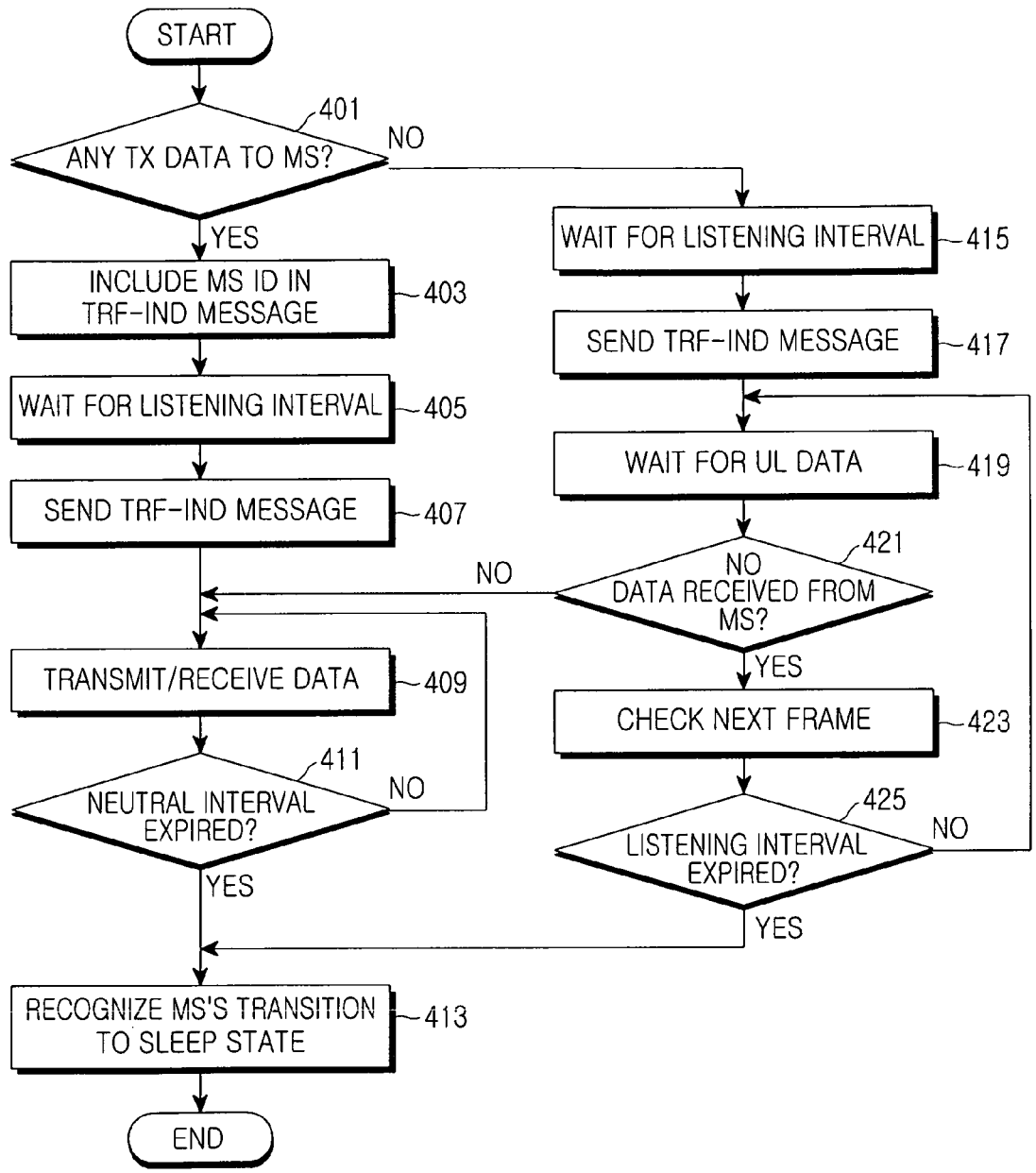
FIG. 4 illustrates an operation of a base station in a communication system according to an embodiment of the present invention.

FIG. 4 illustrates an operation of a BS in a communication system according to an embodiment of the present invention.

First, a description will be made of an operation performed when the BS has data to transmit to the MS.

Referring to FIG. 4, the BS determines in step 401 whether it has data to transmit to the MS. If the BS has data to transmit to the MS, the BS proceeds to step 430 where it includes an identifier of the MS in a TRF-IND message, and then proceeds to step 405. In step 405, the BS waits for the listening interval. Thereafter, the BS transmits the TRF-IND message to the MS in step 407, and transmits the data to the MS in step 409. The BS determines in step 411 whether the neutral interval has expired. If the neutral interval has expired, the BS proceeds to step 413 where it recognizes that the MS has made mode transition to the sleep mode, and then ends the operation.

However, if it is determined in step 411 that the neutral interval has not expired, the BS returns to step 409 and continues the data transmission/reception.

Second, a description will be made of a process in which data from the MS is received at the BS.

Referring to FIG. 4, if it is determined in step 401 that the BS has no data to transmit to the MS, the BS proceeds to step 415 where it waits for the listening interval. Thereafter, the BS transmits a TRF-IND message with no identifier of the MS in step 417, and waits for uplink traffic in the listening interval in step 419. The BS determines in step 421 whether there is no data received from the MS. If there is no data received from the MS, the BS proceeds to step 423 where it checks the next frame whether there is data to transmit/receive. Thereafter, the BS determines in step 425 whether the listening interval has expired. If the listening interval has expired, the BS proceeds to step 413 where it recognizes that the MS has made mode transition to the sleep mode, and then ends the operation. However, if it is determined in step 425 that the listening interval has not expired, the BS returns to step 419 where it waits for the uplink traffic from the MS, and then proceeds to step 421.

However, if it is determined in step 421 that there is data received from the MS, the BS proceeds to step 409 where it receives the data, and then proceeds to step 411. A description of the step 411 and its succeeding step has been made above.

As is apparent from the foregoing description, the present invention provides the system and method for controlling the sleep mode operation considering the reduction of the power consumption in the communication system. The system and method controls the sleep mode operation between the MS and the BS by adaptively applying the neutral interval proposed by the present invention, thereby reducing the power consumption.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for controlling a sleep mode operation by a mobile station in a communication system, the method comprising:

after entering a sleep mode, transitioning to an awake state in a listening interval;

when there is data to transmit to or receive from a base station in the awake state, causing a neutral interval following the listening interval to transition to the awake state, and transmitting or receiving the data; and when there is no data to transmit to or receive from the base station in the awake state, transitioning to the sleep state in the neutral interval, wherein the neutral interval is an interval where transition to the awake state and sleep state in the sleep mode is available according to the data transmission or data reception of the mobile station operating in the sleep mode, and wherein a length of the listening interval and a length of a sleep interval following the neutral interval in the sleep mode are determined through an exchange of a SLP-REQ message and a SLP-RSP message between the mobile station and the base station, and are changed according to a state transition of the neutral interval.

2. The method of claim 1, wherein when the neutral interval transitions to the awake state of the sleep mode, the length of the listening interval is increased, and when the neutral interval transitions to the sleep state of the sleep mode, the length of the sleep interval is increased.

3. The method of claim 1, further comprising:

when there is a need for a change in a length of at least one of the listening interval, the neutral interval, and the sleep interval, transmitting a message including the change information to the base station.

4. The method of claim 3, wherein when the change information indicates an extended use of the neutral interval, a length of the neutral interval is extended, and the length of the sleep interval is decreased.

5. A method for controlling a sleep mode operation by a base station in a communication system, the method comprising:

when there is data to transmit to or receive from a mobile station existing in a listening interval of the sleep mode, transmitting or receiving the data in a neutral interval following the listening interval;

wherein when there is data to transmit to or receive from the mobile station in an awake state, causing the neutral interval to transition to the awake state, and transmitting or receiving the data, wherein when there is no data to transmit to or receive from the mobile station in the awake state, transitioning to a sleep state in the neutral interval, and wherein a length of the listening interval and a length of a sleep interval following the neutral interval in the sleep mode are determined through an exchange of a SLP-REQ message and a SLP-RSP message between the mobile station and the base station, and are changed according to a state transition of the neutral interval.

6. The method of claim 5, wherein when the neutral interval transitions to the awake state of the sleep mode, the length of the listening interval is increased, and when the neutral interval transitions to the sleep state of the sleep mode, the length of the sleep interval is increased.

7. The method of claim 5, further comprising:
when there is a need for a change in a length of at least one of the listening interval, the neutral interval, and the sleep interval, transmitting a message including the change information to the mobile station.

8. The method of claim 7, wherein when the change information indicates an extended use of the neutral interval, a length of the neutral interval is extended, and the length of the sleep interval is decreased.

9. A system for controlling a sleep mode operation of a mobile station, the system comprising:
a base station; and
the mobile station;
wherein after entering a sleep mode, the mobile station transitions to an awake state in a listening interval, and when there is data to transmit to or receive from the base station in the awake state, the mobile station causes a neutral interval following the listening interval to transition to the awake state, and transmits or receives the data, and when there is no data to transmit to or receive from the base station in the awake state, the mobile station transitions to the sleep state in the neutral interval,
wherein the neutral interval is an interval where transition to the awake state and sleep state in the sleep mode is available according to one of the data transmission and data reception of the mobile station operating in the sleep mode, and
wherein a length of the listening interval and a length of a sleep interval following the neutral interval in the sleep mode are determined through an exchange of a SLP-REQ message and a SLP-RSP message between the mobile station and the base station, and are changed according to a state transition of the neutral interval.

10. The system of claim 9, wherein when the neutral interval transitions to the awake state of the sleep mode, the length of the listening interval is increased, and when the neutral interval transitions to the sleep state of the sleep mode, the length of the sleep interval is increased.

11. The system of claim 9, wherein when there is a need for a change in a length of at least one of the listening interval, the neutral interval, and the sleep interval, the mobile station transmits a message including the change information to the base station.

12. The system of claim 9, wherein when the change information indicates an extended use of the neutral interval, a length of the neutral interval is extended, and the length of the sleep interval is decreased.

13. A system for controlling a sleep mode operation of a base station, the system comprising:
the base station; and
a mobile station;
wherein when there is data to transmit to or receive from the mobile station existing in a listening interval of the sleep mode, the base station transmits or receives the data in a neutral interval following the listening interval,
wherein when there is data to transmit to or receive from the mobile station in the awake state, the base station causes the neutral interval to transition to the awake state, and transmits or receives the data, and when there is no data to transmit to or receive from the mobile station in the awake state, the base station transitions to the sleep state in the neutral interval, and
wherein a length of the listening interval and a length of a sleep interval following the neutral interval in the sleep mode are determined through an exchange of a SLP-REQ message and a SLP-RSP message between the mobile station and the base station, and are changed according to a state transition of the neutral interval.

14. The system of claim 13, wherein when the neutral interval transitions to the awake state of the sleep mode, the length of the listening interval is increased, and when the neutral interval transitions to the sleep state of the sleep mode, the length of the sleep interval is increased.

15. The system of claim 13, wherein when there is a need for a change in a length of at least one of the listening interval, the neutral interval, and the sleep interval, the base station transmits a message including the change information to the mobile station.

16. The system of claim 13, wherein when the change information indicates an extended use of the neutral interval, a length of the neutral interval is extended, and the length of the sleep interval is decreased.

* * * * *